US011901571B2

(12) United States Patent
Que et al.

(10) Patent No.: US 11,901,571 B2
(45) Date of Patent: Feb. 13, 2024

(54) MOUNTING BASE, BATTERY AND POWER CONSUMING DEVICE

(71) Applicant: CONTEMPORARY AMPEREX TECHNOLOGY CO., LIMITED, Fujian (CN)

(72) Inventors: Xiaojing Que, Fujian (CN); Cunrui Liu, Fujian (CN); Tiansheng Wang, Fujian (CN); Zijie He, Fujian (CN); Junhua Zhang, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/994,051

(22) Filed: Nov. 25, 2022

(65) Prior Publication Data

US 2023/0086233 A1  Mar. 23, 2023

Related U.S. Application Data

(63) Continuation of application No. PCT/CN2021/126827, filed on Oct. 27, 2021.

(30) Foreign Application Priority Data

Nov. 27, 2020  (CN) .......................... 202011367674.7

(51) Int. Cl.
  *H01M 50/202*  (2021.01)
  *H01M 50/296*  (2021.01)
  (Continued)

(52) U.S. Cl.
  CPC ....... *H01M 50/202* (2021.01); *H01M 50/256* (2021.01); *H01M 50/296* (2021.01); *H01M 50/543* (2021.01); *H01M 50/59* (2021.01)

(58) Field of Classification Search
  CPC ..................... H01M 10/0468; H01M 10/0481
  See application file for complete search history.

(56) References Cited

U.S. PATENT DOCUMENTS

| 2012/0052359 A1* | 3/2012 | Yoshitake | ........... H01M 10/625 |
| | | | 429/120 |
| 2012/0282502 A1 | 11/2012 | Kim | |
| 2020/0106079 A1* | 4/2020 | You | .......................... H01R 4/70 |

FOREIGN PATENT DOCUMENTS

| CN | 104716359 A | 6/2015 |
| CN | 206742340 U | 12/2017 |

(Continued)

OTHER PUBLICATIONS

International Search Report and Written Opinion dated Jan. 27, 2022, received for PCT Application PCT/CN2021/126827, filed on Oct. 27, 2021, 18 pages including English Translation.

(Continued)

*Primary Examiner* — Maria Laios
(74) *Attorney, Agent, or Firm* — XSENSUS LLP

(57) ABSTRACT

The present application provides a mounting base, a battery and a power consuming device, which relate to the technical field of batteries. The mounting base may be configured to be connected to an end plate and an output electrode, and an insulating structure may be provided on one side of the end plate and configured to insulate the end plate from a battery cell. The mounting base may include a main body provided with a flow guiding groove on the side facing the insulating structure. The flow guiding groove may be configured to prevent an electrical connection between the output electrode and the end plate by means of a liquid between the main body and the insulating structure.

9 Claims, 4 Drawing Sheets

(51) Int. Cl.
*H01M 50/256* (2021.01)
*H01M 50/543* (2021.01)
*H01M 50/59* (2021.01)

(56) References Cited

FOREIGN PATENT DOCUMENTS

| | | |
|---|---|---|
| CN | 108428826 A | 8/2018 |
| CN | 108550734 A | 9/2018 |
| CN | 207818738 U | 9/2018 |
| CN | 207896173 U | 9/2018 |
| CN | 208111497 U | 11/2018 |
| CN | 110323377 A | 10/2019 |
| CN | 210403878 U | 4/2020 |
| CN | 211265535 U | 8/2020 |
| CN | 211879494 U | 11/2020 |
| CN | 112531299 A | 3/2021 |
| JP | H07-232565 A | 9/1995 |
| JP | 2020-064733 A | 4/2020 |
| KR | 2002-0066923 A | 8/2002 |
| WO | 2013/179796 A1 | 12/2013 |
| WO | 2018/042762 A1 | 3/2018 |
| WO | 2018/042763 A1 | 3/2018 |

OTHER PUBLICATIONS

Office Action dated Sep. 29, 2022, in corresponding Chinese patent Application No. 202011367674.7, 17 pages.
Office Action dated Feb. 28, 2023 in Japanese Patent Application No. 2022-551021 with computer-generated English translation thereof, 10 pages.
Office Action dated Jul. 25, 2023 in Japanese Patent Application No. 2022-551021 with computer-generated English translation thereof, 6 pages.
Notification of Grant Patent Eight for Invention dated Dec. 5, 2022 in Chinese Patent Application No. 202011367674.7, 1 page.

* cited by examiner

MOUNTING BASE, BATTERY AND POWER CONSUMING DEVICE

CROSS-REFERENCE TO RELATED APPLICATIONS

The present application is a continuation of International Application No. PCT/CN2021/126827, filed Oct. 27, 2021, which claims priority to Chinese patent application no. 202011367674.7, entitled "MOUNTING BASE, BATTERY AND POWER CONSUMING DEVICE", filed on Nov. 27, 2020, each of which is incorporated herein by reference in its entirety.

TECHNICAL FIELD

The present application relates to the technical field of batteries, and in particular to a mounting base, a battery and a power consuming device.

BACKGROUND ART

Generally, a battery includes an end plate, a mounting base, an output electrode, an insulating member and a battery cell. An electrode terminal of the battery cell is electrically connected to the output electrode, the mounting base is mounted on the end plate, the output electrode is mounted on the mounting base, the mounting base can provide insulation protection for the output electrode, the mounting base insulates the output electrode from the end plate, the insulating member is provided between the battery cell and the end plate, and the insulating member insulates the battery cell from the end plate.

In some cases, the battery is prone to short circuiting, so the safety needs to be improved.

SUMMARY OF THE DISCLOSURE

Embodiments of the present application provide a mounting base, a battery and a power consuming device, which can improve the safety of the battery.

In a first aspect, an embodiment of the present application provides a mounting base configured to be connected to an end plate and an output electrode, an insulating member being provided on one side of the end plate and configured to insulate the end plate from a battery cell, the mounting base comprising a main body provided with a flow guiding groove on the side facing the insulating member, wherein the flow guiding groove is configured to prevent an electrical connection between the output electrode and the end plate by means of a liquid between the main body and the insulating member.

In the solution described above, the provision of the flow guiding groove on the side of the main body of the mounting base facing the insulating member increases the distance between the main body and the insulating member at the position where the flow guiding groove is provided, and a liquid film is not prone to being formed between this position and the insulating member, so that it is not likely to form a continuous liquid film between the main body and the insulating member, thereby effectively reducing the risk of electrical connection between the output electrode and the end plate by means of the liquid between the main body and the insulating member, which could otherwise cause failure of the insulation protection of the output electrode from the mounting base, the battery is less prone to short circuiting, and the safety of the battery is improved.

In some embodiments, the main body has a first end and a second end that are opposite to each other in a first direction, the first end being configured to be connected to the end plate, and the second end being configured to have the output electrode mounted thereon.

The flow guiding groove runs through two sides of the main body in a second direction that is perpendicular to the first direction.

In the solution described above, the flow guiding groove runs through the two sides of the main body in the second direction, and the flow guiding groove can divide the liquid film between the main body and the insulating member into two parts located on two sides of the flow guiding groove in the first direction, further reducing the possibility of forming a continuous liquid film between the main body and the insulating member in the first direction.

In some embodiments, the main body includes a base portion, a first abutment portion and a second abutment portion.

The base portion has a first side face.

The first abutment portion protrudes from the first side face, and the first abutment portion is configured to abut against the insulating member.

The second abutment portion protrudes from the first side face, the second abutment portion is arranged opposite to the first abutment portion in the first direction, and the second abutment portion is configured to abut against the insulating member.

The first abutment portion, the first side face, and the second abutment portion jointly define the flow guiding groove.

In the solution described above, the flow guiding groove is defined jointly by the first abutment portion, the first side face and the second abutment portion, and the first abutment portion and the second abutment portion that are arranged opposite to each other in the first direction in the main body can be both configured to abut against the insulating member, improving the stability of the main body after mounted on the end plate.

In some embodiments, the height by which the first abutment portion protrudes from the first side face is equal to the height by which the second abutment portion protrudes from the first side face.

In the solution described above, the height by which the first abutment portion protrudes from the first side face is equal to the height by which the second abutment portion protrudes from the first side face, Such a structure makes it easier to ensure that the first abutment portion and the second abutment portion simultaneously abut against the insulating member after the main body is mounted on the end plate.

In some embodiments, the base portion is provided with an insertion portion configured to be fitted with an insertion groove in the end plate so as to limit the disengagement of the main body from the end plate in the first direction.

In the solution described above, the insertion portion on the base portion may be insert-fitted with the insertion groove in the end plate so as to limit the main body, thereby achieving the purpose of limiting the disengagement of the main body from the end plate in the first direction. Such a structure can achieve quick assembly and disassembly of the mounting base and the end plate.

In some embodiments, the insertion portion extends in a third direction, and one end of the insertion portion extends beyond the first side face to abut against the insulating member.

Every two of the first direction, the second direction, and the third direction are perpendicular to each other.

In the solution described above, the insertion portion on the base portion may be configured to be fitted with the insertion groove in the end plate so as to limit the main body; and the insertion portions may also be configured to abut against the insulating member increase the contact area between the main body and the insulating member, further improving the stability of the main body after mounted on the end plate.

In some embodiments, the first abutment portion has a first abutment face for abutting against the insulating member.

The insertion portion has a second abutment face for abutting against the insulating member, the second abutment face being coplanar with the first abutment face.

In the solution described above, the first abutment face of the first abutment portion for abutting against the insulating member is coplanar with the second abutment face of the insertion portion for abutting against the insulating member, and such a structure makes it easier to ensure that the first abutment face and the second abutment face simultaneously abut against the insulating member after the main body is mounted on the end plate.

In some embodiments, the flow guiding groove has a depth greater than or equal to 2 millimeters.

In the solution described above, the depth of the flow guiding groove is greater than or equal to 2 millimeters, so that there is a large distance between the bottom wall of the flow guiding groove and the insulating member, the liquid film adhered to the insulating member and the bottom wall of the flow guiding groove is not prone to being formed at the position of the main body where the flow guiding groove is provided, and it is not likely to form a continuous liquid film between the main body and the insulating member.

In some embodiments, the main body is provided with a liquid discharging hole in communication with the flow guiding groove.

In the solution described above, the main body is provided with a liquid discharging hole in communication with the flow guiding groove. The liquid discharging hole can discharge the liquid from the flow guiding groove, and the liquid is less likely to accumulate in the flow guiding groove, further reducing the possibility of forming a liquid film between the main body and the insulating member at the position where the flow guiding groove is provided.

In a second aspect, an embodiment of the present application provides a battery, comprising an end plate, a battery cell, an output electrode, an insulating member, and a mounting base provided in the first aspect or in any one of the embodiments in the first aspect.

The output electrode is connected to an electrode terminal of the battery cell and configured to output electric energy of the battery cell.

The insulating member is provided between the battery cell and the end plate to insulate the end plate from the battery cell.

The mounting base is mounted on the end plate, the output electrode is mounted on the mounting base, and the flow guiding groove is formed in the side of the main body facing the insulating member.

In the solution described above, the provision of the flow guiding groove on the side of the main body of the mounting base facing the insulating member in the battery increases the distance between the main body and the insulating member at the position where the flow guiding groove is provided, and a liquid film is not prone to being formed between this position and the insulating member, so that it is not likely to form a continuous liquid film between the main body and the insulating member, thereby effectively reducing the risk of electrical connection between the output electrode and the end plate by means of the liquid between the main body and the insulating member, which could otherwise cause failure of the insulation protection of the output electrode from the mounting base, the battery is less prone to short circuiting, and the safety of the battery is improved.

In a third aspect, an embodiment of the present application further provides a power consuming device, comprising a battery provided in the second aspect.

BRIEF DESCRIPTION OF THE DRAWINGS

In order to more clearly describe the technical solutions of the embodiments of the present application, the drawings used in the embodiments will be described briefly below. It should be understood that the following drawings illustrate only some embodiments of the present application and should therefore not be construed as a limitation on the scope thereof. For those of ordinary skill in the art, other relevant drawings can also be obtained from these drawings without any creative effort.

LIST OF REFERENCE SIGNS

Figure 1:
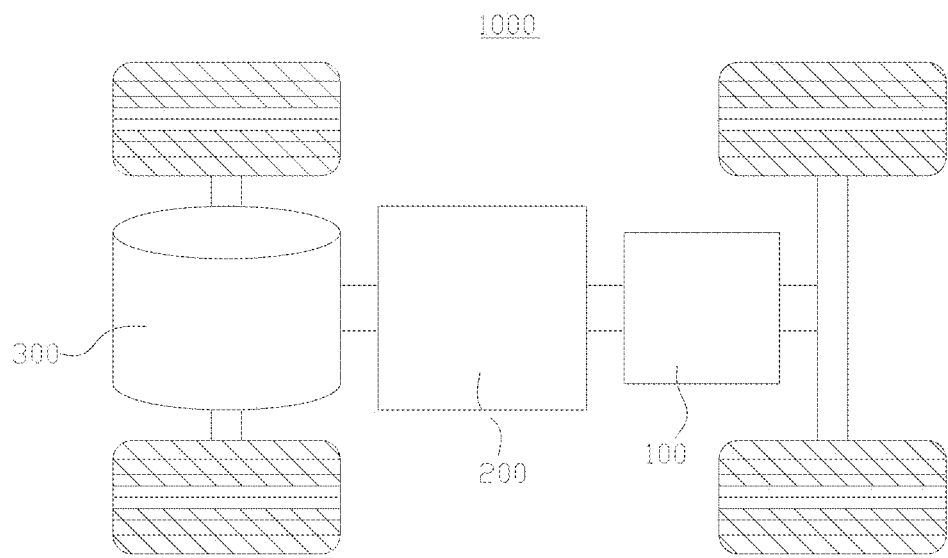
FIG. 1 is a schematic structural diagram of a vehicle provided in some embodiments of the present application.

10—End plate; 11—Insertion groove; 12—Groove; 20—Battery cell; 30—Output electrode; 31—Mounting hole; 32—Screw; 40—Insulating member; 50—Mounting base; 51—Main body; 511—Flow guiding groove; 512—First end; 513—Second end; 514—Base portion; 5141—First side face; 515—First abutment portion; 5151—Abutment segment; 5152—First abutment face; 516—Second abutment portion; 517—Liquid discharging hole; 518—insertion portion; 5181—Second abutment face; 520—Enclosure; 5201—First protrusion; 5202—Second protrusion; 521—Accommodating space; 522—Projection portion; 53—Screw sleeve; 60—Bus component; 70—Bottom plate; 80—Side plate; 90—Case; 100—Battery; 200—Controller; 300—Motor; 1000—Vehicle; Z—First direction; X—Second direction; and Y—Third direction.

DETAILED DESCRIPTION OF EMBODIMENTS

In order to make the objectives, technical solutions and advantages of the embodiments of the present application clearer, the technical solutions in the embodiments of the present application will be described clearly below with reference to the drawings in the embodiments of the present application. Obviously, the embodiments described are some of, rather than all of, the embodiments of the present application. All the other embodiments obtained by those of ordinary skill in the art based on the embodiments of the present application without creative efforts shall fall within the scope of protection of the present application.

Unless otherwise defined, all technical and scientific terms used in the present application have the same meanings as those commonly understood by those skilled in the art to which the present application belongs; the terms used in the description of the present application are merely for the purpose of describing specific embodiments, but are not intended to limit the present application. The terms "comprising" and "having" and any variations thereof in the description and the claims of the present application as well as the brief description of the drawings described above are intended to cover non-exclusive inclusion. The terms "first", "second", etc. in the description and the claims of the present application as well as the foregoing drawings are used to distinguish between different objects, rather than describing a specific order or a primary-secondary relationship.

In the present application, "embodiment" mentioned means that the specific features, structures and characteristics described in conjunction with the embodiments may be included in at least one embodiment of the present application. The phrase at various locations in the description does not necessarily refer to the same embodiment, or an independent or alternative embodiment exclusive of another embodiment. Those skilled in the art should understand, in explicit and implicit manners, that an embodiment described in the present application may be combined with another embodiment.

In the description of the present application, it should be noted that, the terms "mount", "connected", "connect", or "attach" should be interpreted in a broad sense unless explicitly defined and limited otherwise. For example, they may be a fixed connection, a detachable connection, or an integral connection; or may be a direct connection, an indirect connection by means of an intermediate medium, or internal communication between two elements. For those of ordinary skills in the art, the specific meaning of the foregoing terms in the present application may be understood according to specific circumstances.

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the accompanying drawings, as well as the dimensions, such as an overall thickness, length and width, of an integrated apparatus are merely illustrative and should not be construed to limit the present application in any way.

"A plurality of" appearing in the present application means two or more (including two).

In the present application, a battery cell may include a lithium ion secondary battery, a lithium ion primary battery, a lithium-sulfur battery, a sodium-lithium ion battery, a sodium ion battery or a magnesium ion battery, etc., which will not be limited in the embodiments of the present application. The battery cell may be cylindrical, flat, cuboid or in another shape, which will also not be limited in the embodiments of the present application. The battery cells are generally classified into three types depending on the way of package: cylindrical battery cells, prismatic battery cells and pouch battery cells, which will also not be limited in the embodiments of the present application.

A battery mentioned in the embodiments of the present application refers to a single physical module comprising one or more battery cells to provide a high voltage and capacity. For example, the battery mentioned in the present application may include a battery module, a battery pack, etc. The battery generally comprises a case for packaging one or more battery cells. The case can prevent liquid or other foreign matters from affecting the charging or discharging of the battery cell.

The battery cell comprises an electrode assembly and an electrolytic solution. The electrode assembly is composed of a positive electrode plate, a negative electrode plate and a separator. The operation of the battery cell mainly relies on the movement of metal ions between the positive electrode plate and the negative electrode plate. The positive electrode plate comprises a positive electrode current collector and a positive electrode active material layer. A surface of the positive electrode current collector is coated with the positive electrode active material layer, the positive electrode current collector that is not coated with the positive electrode active material layer protrudes from the positive electrode current collector coated with the positive electrode active material layer, and the positive electrode current collector that is not coated with the positive electrode active material layer is used as a positive electrode tab. Taking a lithium ion battery as an example, the positive electrode current collector may be made of aluminum, and the positive electrode active material may be lithium cobalt oxide, lithium iron phosphate, ternary lithium, lithium manganate, etc. The negative electrode plate comprises a negative electrode current collector and a negative electrode active material layer. A surface of the negative electrode current collector is coated with the negative electrode active material layer, the negative electrode current collector that is not coated with the negative electrode active material layer protrudes from the negative electrode current collector coated with the negative electrode active material layer, and the negative electrode current collector that is not coated with the negative electrode active material layer is used as a negative electrode tab. The negative electrode current collector may be made of copper, and the negative electrode active material may be carbon, silicon, etc. In order to ensure that no fusing occurs when a large current passes, a plurality of positive electrode tabs are provided and are stacked together, and a plurality of negative electrode tabs are provided and are stacked together. The separator may be made of PP (polypropylene), PE (polyethylene), etc. In addition, the electrode assembly may be of a wound structure or a laminated structure, which will not be limited in the embodiments of the present application. Design factors on many aspects need to be simultaneously considered for the development of the battery technology, such as energy density, cycling life, discharge capacity, charge-discharge rate, and other performance parameters. In addition, the safety of the battery needs to be taken into account.

Generally, in a battery, a mounting base is mounted on an end plate, an output electrode is mounted on the mounting base, the mounting base is located between the output electrode and the mounting base and abuts against an insulating member, the mounting base can provide insulation protection for the output electrode, the mounting base insulates the output electrode from the end plate, and the insulating member is arranged between a battery cell and the end plate and insulates the battery cell from the end plate.

The inventors have found that the battery is vulnerable to the risk of short circuiting, and after study, the inventors have found that in some scenarios (such as in a condensation scenario), a liquid is easily adhered between the mounting base and the insulating member, so that a thin liquid film is formed between the mounting base and the insulating member, it is likely to cause an electrical connection between the output electrode and the end plate by means of the liquid between the mounting base and the insulating member, thus resulting in failure of insulation protection of the output electrode from the mounting base, affecting the insulation between the output electrode and the end plate, or even causing the risk of short circuiting.

In view of this, without being held to a particular theory, some embodiments of the present application provide a technical solution in which a flow guiding groove is provided in the side of a main body of the mounting base facing the insulating member. The provision of the flow guiding groove increases the distance between the main body and the insulating member at the position where the flow guiding groove is provided, and a liquid film is not prone to being formed between this position and the insulating member, thereby effectively reducing the risk of electrical connection between the output electrode and the end plate by means of the liquid between the main body and the insulating member, which could otherwise cause the failure of the insulation protection of the output electrode from the mounting base.

The liquid film mentioned in the embodiments of the present application is a thin layer of liquid that stays between the main body and the insulating member.

The technical solution described in the embodiments of the present application is applicable to a battery and a power consuming device using the battery.

The power consuming device may be a vehicle, a mobile phone, a portable device, a notebook computer, a ship, a spacecraft, an electric toy, an electric tool, etc. The vehicle may be a fuel vehicle, a gas vehicle or a new-energy vehicle. The new-energy vehicle may be a battery electric vehicle, a hybrid vehicle, an extended-range vehicle, etc. The spacecraft includes an airplane, a rocket, an aerospace plane, a spaceship, etc. The electric toy includes a stationary or mobile electric toy, such as a game machine, an electric toy car, an electric toy ship, and an electric toy airplane. The electric tool includes a metal cutting electric tool, a grinding electric tool, an assembling electric tool, and a railway electric tool, such as an electric drill, an electric grinder, an electric wrench, an electric screwdriver, an electric hammer, an electric impact drill, a concrete vibrator, and an electric planer. The power consuming devices mentioned above are not specially limited in the embodiments of the present application.

For ease of description, an example in which the power consuming device refers to a vehicle is used for description in the following embodiments.

Referring to FIG. 1, FIG. 1 is a schematic structural diagram of a vehicle 1000 provided in some embodiments of the present application. A battery 100 is provided inside the vehicle 1000, and the battery 100 may be provided at the bottom, the front or the back of the vehicle 1000. The battery 100 may be configured to supply power to the vehicle 1000. For example, the battery 100 may be used as an operating power supply of the vehicle 1000.

The vehicle 1000 may further comprise a controller 200 and a motor 300. The controller 200 is configured to control the battery 100 to supply power to the motor 300, for example, to satisfy the working power requirements during the starting, navigation and traveling of the vehicle 1000.

In some embodiments of the present application, the battery 100 can not only serve as an operating power supply for the vehicle 1000, but also serve as a driving power supply for the vehicle 1000, in place of or partially in place of fuel or natural gas, to provide driving power for the vehicle 1000.

Figure 2:
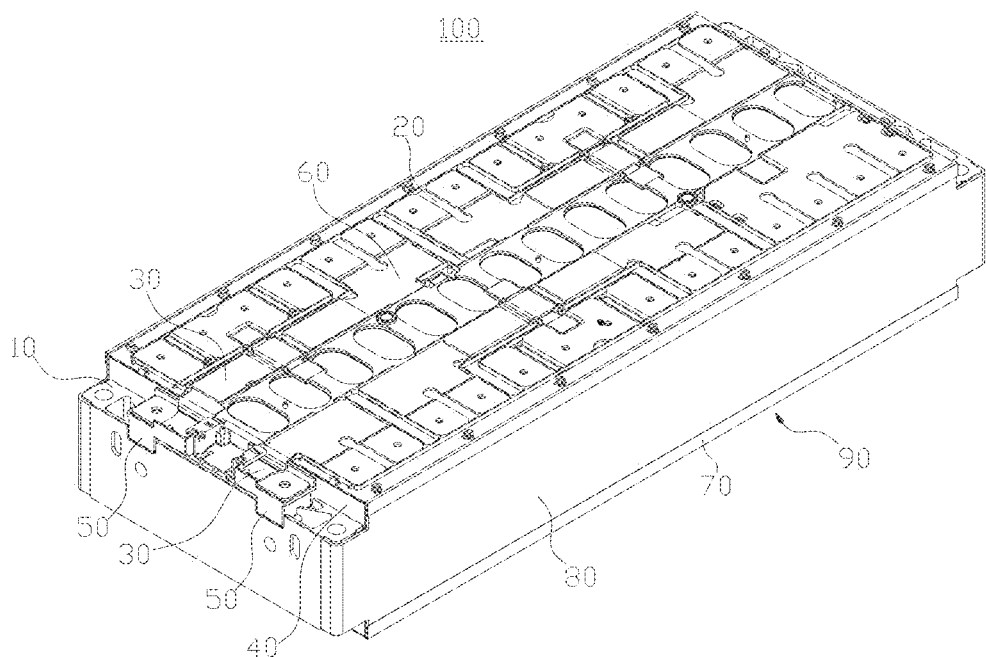
FIG. 2 is a schematic structural diagram of a battery provided in some embodiments of the present application.

Referring to FIG. 2, FIG. 2 is a schematic structural diagram of a battery 100 provided in some embodiments of the present application. The battery 100 includes an end plate 10, a battery cell 20, an output electrode 30, an insulating member 40, and a mounting base 50.

The output electrode 30 is connected to an electrode terminal of the battery cell 20 and configured to output electric energy of the battery cell 20. The insulating member 40 is provided between the battery cell 20 and the end plate 10 to insulate the end plate 10 from the battery cell 20. The mounting base 50 is mounted on the end plate 10, and the output electrode 30 is mounted on the mounting base 50.

In the battery 100, one or more battery cells 20 may be provided. If a plurality of battery cells 20 are provided, the plurality of battery cells 20 may be connected to each other in series, in parallel, or in series-parallel. The series-parallel connection refers that some of the plurality of battery cells 20 are connected in series and the rest are connected in parallel. The plurality of battery cells 20 may be directly connected to each other in series or in parallel or in series-parallel. Of course, it is also possible that a plurality of battery cells 20 are first connected in series or in parallel or in series-parallel to form a battery module, and a plurality of battery modules are then connected in series or in parallel or in series-parallel connection to form a whole.

Illustratively, in FIG. 2, a plurality of battery cells 20 are provided, the plurality of battery cells 20 may be electrically connected to each other via a bus component 60 to implement series connection or parallel connection or series-parallel connection of the plurality of battery cells 20.

In some embodiments, still referring to FIG. 2, two end plates 10 may be provided, the plurality of battery cells 20 are located between the two end plates 10, and the two end plates 10 may function to limit the battery cells 20.

The output electrode 30 may be a metal conductor. Illustratively, the output electrode 30 is a metal conductive sheet. Two output electrodes 30 may also be provided, one of the output electrodes 30 is configured to be electrically connected to a positive electrode terminal of one battery cell 20, and the other output electrode 30 is configured to be electrically connected to a negative electrode terminal of one battery cell 20. The two output electrodes 30 may be respectively connected to the positive electrode terminal and the negative electrode terminal of the same battery cell 20. For example, where a plurality of battery cells 20 are connected in parallel, the two output electrodes 30 may be respectively electrically connected to the positive electrode terminal and the negative electrode terminal of any one of the battery cells 20. It is also possible that one of the output electrodes 30 is electrically connected to the positive electrode terminal of one battery cell 20 and the other output electrode 30 is electrically connected to the negative electrode terminal of another battery cell 20. For example, where a plurality of battery cells 20 are connected in series, one of the output electrodes 30 is electrically connected to the positive electrode terminal of the first one of the battery cells 20 connected in series, and the other output electrode 30 is electrically connected to the negative electrode terminal of the last one of the battery cells 20 connected in series.

Two mounting bases 50 may also be provided, with each output electrode 30 being mounted on one mounting base 50. The two mounting bases 50 may be respectively mounted on the two end plates 10, namely, each end plate 10 correspondingly has one mounting base 50 mounted thereon. As shown in FIG. 2, the two mounting bases 50 may also be mounted on the same end plate 10.

Two insulating members 40 may also be provided, with each mounting base 50 being correspondingly provided with one insulating member 40, the insulating member 40 is located between the end plate 10 and the battery cell 20, and the insulating member 40 is configured to insulate the battery cell 20 from the end plate 10.

Figure 3:
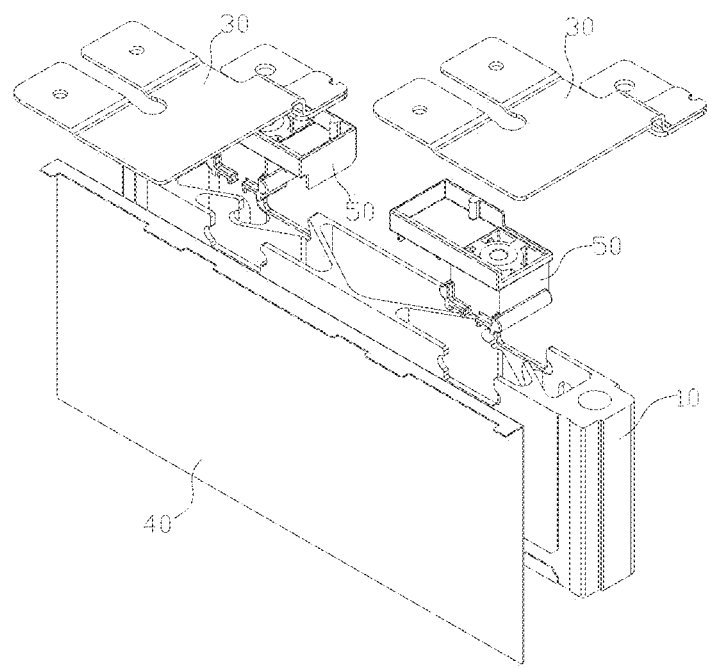
FIG. 3 is a partial exploded view of the battery shown in FIG. 2.

Referring to FIG. 3, FIG. 3 is a partial exploded view of the battery 100 shown in FIG. 2, the insulating member 40 is provided on one side of the end plate 10 in a thickness direction, and after the mounting base 50 is mounted on the end plate 10, the mounting base 50 abuts against the insulating member 40.

The insulating member 40 is made of an insulating material, which may be rubber, plastic, etc. The plastic may be polybutylene terephthalate (PBT), polyethylene terephthalate (PET), polyamide (PA), etc.

Illustratively, the insulating member 40 is of a plate-shaped structure.

In some embodiments, still referring to FIG. 2, the battery 100 may further include a bottom plate 70 and two side plates 80. The bottom plate 70, the two side plates 80, and the two end plates 10 jointly define a case 90 having an open top. The battery cells 20 are accommodated in the case 90. Of course, the battery 100 may further include a cover which covers the top of the case 90 and which is sealingly connected to the case 90. The cover and the case 90 jointly form a sealed space for accommodating the battery cells 20.

Figure 4:
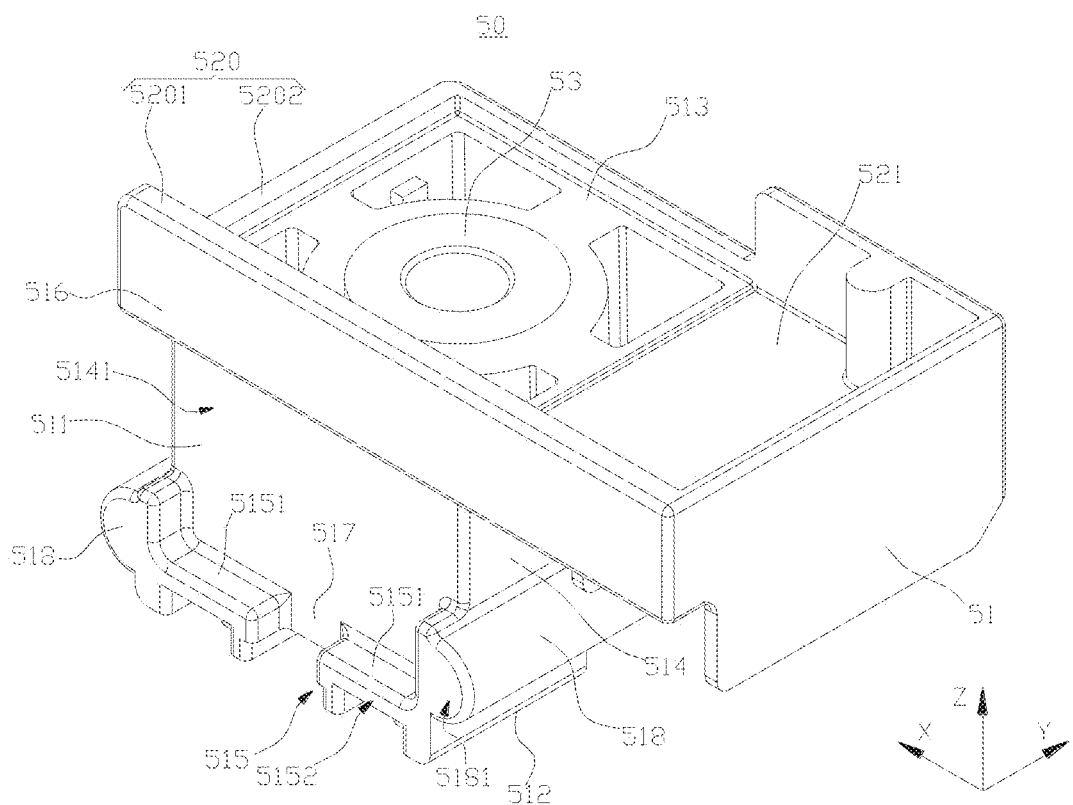
FIG. 4 is a schematic structural diagram of a mounting base shown in FIG. 3.

Referring to FIG. 4, FIG. 4 is a schematic structural diagram of the mounting base 50 shown in FIG. 3. In the embodiments of the present application, the mounting base 50 includes a main body 51. The main body 51 is provided with a flow guiding groove 511 on the side facing the insulating member 40 (shown in FIG. 3). The flow guiding groove 511 is configured to prevent an electrical connection between the output electrode 30 and the end plate 10 by means of the liquid between the main body 51 and the insulating member 40.

The provision of the flow guiding groove 511 on the side of the main body 51 facing the insulating member 40 increases the distance between the main body 51 and the insulating member 40 at the position where the flow guiding groove 511 is provided, and a liquid film is not prone to being formed between this position and the insulating member 40, so that it is not likely to form a continuous liquid film between the main body 51 and the insulating member 40, thereby effectively reducing the risk of electrical connection between the output electrode 30 and the end plate 10 by means of the liquid between the main body 51 and the insulating member 40, which could otherwise cause failure of the insulation protection of the output electrode 30 from the mounting base 50, the battery 100 is less prone to short circuiting, and the safety of the battery 100 is improved.

The main body 51 is made of an insulating material, and the main body 51 is used for providing insulation protection for the output electrode 30. The main body 51 may be made of plastic, rubber or etc. The plastic may be polybutylene terephthalate (PBT), polyethylene terephthalate (PET), polyamide (PA), etc. Illustratively, the main body 51 may be formed by means of thermoplastic molding.

In the embodiments of the present application, the provision of the flow guiding groove 511 increases the distance between the main body 51 and the insulating member 40 at the position where the flow guiding groove 511 is provided, so that a liquid film is not prone to being formed between this position and the insulating member 40. That is to say, the distance from the bottom wall of the flow guiding groove 511 to the insulating member 40 is greater than the distance from the insulating member 40 to the portion, provided with no flow guiding groove 511, of the main body 51 on the side facing the insulating member 40, so that the liquid is not prone to staying between the bottom wall of the flow guiding groove 511 and the insulating member 40, and a liquid film is not prone to being formed between the bottom wall of the flow guiding groove 511 and the insulating member 40. The greater the depth of the flow guiding groove 511, the greater the distance between the bottom wall of the flow guiding groove 511 and the insulating member 40, and the less a liquid film prone to being formed between the bottom wall of the flow guiding groove 511 and the insulating member 40.

In some embodiments, the depth of the flow guiding groove 511 is greater than or equal to 2 millimeters, so that there is a large distance between the bottom wall of the flow guiding groove 511 and the insulating member 40, the liquid film adhered to the insulating member 40 and the bottom wall of the flow guiding groove 511 is not prone to being formed at the position of the main body 51 where the flow guiding groove 511 is provided, and it is not likely to form a continuous liquid film between the main body 51 and the insulating member 40.

In some embodiments, the depth of the flow guiding groove 511 is greater than or equal to 2.5 mm, so that the distance between the bottom wall of the flow guiding groove 511 and the insulating member 40 is further increased, and it is not likely to form a continuous liquid film between the main body 51 and the insulating member 40.

In some embodiments, still referring to FIG. 4, the main body 51 has a first end 512 and a second end 513 that are opposite to each other in a first direction Z, the first end 512 is configured to be connected to the end plate 10 (shown in FIG. 3), and the second end 513 is configured to have the output electrode 30 (shown in FIG. 3) mounted thereon. The second flow guiding groove 511 runs through two sides of the main body 51 in a second direction X. The second direction X is perpendicular to the first direction Z.

Since the flow guiding groove 511 runs through the two sides of the main body 51 in the second direction X, and the flow guiding groove 511 can divide the liquid film between the main body 51 and the insulating member 40 (shown in FIG. 3) into two parts located on two sides of the flow guiding groove 511 in the first direction Z, further reducing the possibility of forming a continuous liquid film between the main body 51 and the insulating member 40 in the first direction Z.

It should be noted that the first flow guiding groove 511 may be arranged in the same direction as the second direction X or at an included angle with the second direction X. In FIG. 4, the first flow guiding groove 511 is arranged in the same direction as the second direction X.

In some embodiments, still referring to FIG. 4, the main body 51 includes a base portion 514, a first abutment portion 515, and a second abutment portion 516. The base portion 514 has a first side face 5141, the first abutment portion 515 protrudes from the first side face 5141, and the first abutment portion 515 is configured to abut against the insulating member 40. The second abutment portion 516 protrudes from the first side face 5141, the second abutment portion 516 is arranged opposite to the first abutment portion 515 in the first direction Z, and the second abutment portion 516 is configured to abut against the insulating member 40. The first abutment portion 515, the first side face 5141 and the second abutment portion 516 jointly define the flow guiding groove 511.

The first abutment portion 515 and the second abutment portion 516 that are arranged opposite to each other in the first direction Z in the main body 51 can be both configured to abut against the insulating member 40, improving the stability of the main body 51 after mounted on the end plate 10.

The first abutment portion 515 is closer to the first end 512 than the second abutment portion 516.

It should be noted that a part of the first side face 5141 is the bottom wall of the flow guiding groove 511.

Illustratively, the height by which the first abutment portion 515 protrudes from the first side face 5141 is equal to the height by which the second abutment portion 516 protrudes from a second side face. Such a structure makes it easier to ensure that the first abutment portion 515 and the second abutment portion 516 simultaneously abut against the insulating member 40 after the main body 51 is mounted on the end plate 10.

In this embodiment, since the first abutment portion 515, the first side face 5141 and the second abutment portion 516 jointly define the flow guiding groove 511, the parts of the main body 51 on the two sides of the flow guiding groove 511 in the first direction Z (the first abutment portion 515 and the second abutment portion 516) may be both configured to abut against the insulating member 40. In other embodiments, the flow guiding groove 511 may also run to the first end 512 of the main body 51, and the part of the main body 51 on the side of the flow guiding groove 511 close to the second end 513 may be configured to abut against the insulating member 40; or the flow guiding groove 511 may run to the second end 513 of the main body 51, and the part of the main body 51 on the side of the flow guiding groove 511 close to one end may be configured to abut against the insulating member 40.

In some embodiments, and still referring to FIG. 4, the main body 51 is provided with a liquid discharging hole 517 in communication with the flow guiding groove 511. The liquid discharging hole 517 can discharge the liquid from the flow guiding groove 511, and the liquid is less likely to accumulate in the flow guiding groove 511, further reducing the possibility of forming a liquid film between the main body 51 and the insulating member 40 at the position where the flow guiding groove 511 is provided.

Illustratively, the liquid discharging hole 517 is provided in the first abutment portion 515, and the liquid discharging hole 517 divides the first abutment portion 515 into two abutment segments 5151 distributed spaced apart from each other in the second direction X. Such a structure further facilitates discharge of the liquid from the flow guiding groove 511.

In the embodiments of the present application, the main body 51 may be fixedly connected to the end plate 10. For example, the main body 51 and the end plate 10 are fixed by means of adhesive bonding. Alternatively, the main body 51 may be detachably connected to the end plate 10. For example, the main body 51 is in an inserted connection with the end plate 10. For another example, the main body 51 is connected to the end plate 10 by means of a bolt.

Figure 5:
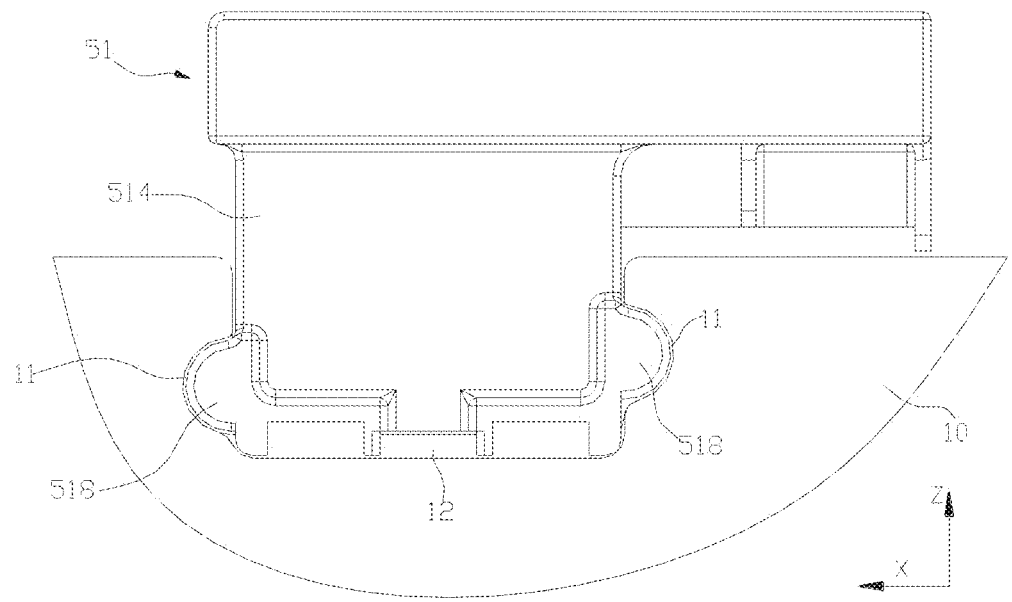
FIG. 5 is a schematic diagram of mounting of the mounting base and an end plate of the battery shown in FIG. 2.

In some embodiments, in conjunction with FIGS. 4 and 5, FIG. 5 is a schematic diagram of mounting of the mounting base 50 and the end plate 10 of the battery 100 shown in FIG. 2. The main body 51 of the mounting base 50 is in an inserted connection with the end plate 10, the base portion 514 of the main body 51 is provided with an insertion portion 518, the end plate 10 is provided with an insertion groove 11, and the insertion portion 518 is configured to be insert-fitted with the insertion groove 11 so as to limit the disengagement of the main body 51 from the end plate 10 in the first direction Z. Such a structure enables quick assembly and disassembly of the mounting base 50 and the end plate 10.

It should be noted that one or more insertion portions 518 may be provided on the base portion 514. In FIGS. 4 and 5, illustratively, there are two insertion portions 518 on the base portion 514, and the two insertion portions 518 are respectively provided on two sides of the base portion 514 in the second direction X.

Illustratively, as shown in FIG. 5, the insertion grooves 11 in the end plate 10 correspond to the insertion portions 518 on a one-to-one basis, the top end of the end plate 10 in a height direction is provided with a downwardly recessed groove 12, the groove 12 runs through two ends of the end plate 10 in the thickness direction, and the insertion grooves 11 are formed in two opposite side walls of the groove 12. The height direction of the end plate 10 coincides with the first direction Z.

When the main body 51 is being mounted, the base portion 514 of the main body 51 may be moved toward the groove 12 in the thickness direction of the end plate 10, so that the two insertion portions 518 of the base portion 514 in the second direction X are respectively inserted into the two insertion grooves 11, and the main body 51 is thus mounted on the end plate 10.

In some embodiments, still referring to FIG. 4, the insertion portions 518 extend in a third direction Y, with one end of the insertion portion 518 extending beyond the first side face 5141 so as to abut against the insulating member 40. Every two of the first direction Z, the second direction X and the third direction Y are perpendicular to each other.

The insertion portions 518 may be configured to be fitted with the insertion grooves 11 in the end plate 10 so as to limit the main body 51; and the insertion portions 518 may also be configured to abut against the insulating member 40, to increase the contact area between the main body 51 and the insulating member 40, further improving the stability of the main body 51 after mounted on the end plate 10.

It should be noted that after the insertion portions 518 are insert-fitted with the insertion grooves 11, namely, after the main body 51 is mounted on the end plate 10, the first direction Z is the height direction of the end plate 10, the second direction X is the length direction of the end plate 10, and the third direction Y is the thickness direction of the end plate 10.

In some embodiments, still referring to FIG. 4, the first abutment portion 515 has a first abutment face 5152 for abutting against the insulating member 40. The insertion portion 518 has a second abutment face 5181 for abutting against the insulating member 40, and the second abutment face 5181 is coplanar with the first abutment face 5152.

The first abutment face 5152 of the first abutment portion 515 for abutting against the insulating member 40 is coplanar with the second abutment face 5181 of the insertion portion 518 for abutting against the insulating member 40, and such a structure makes it easier to ensure that the first abutment face 5152 and the second abutment face 5181 simultaneously abut against the insulating member 40 after the main body 51 is mounted on the end plate 10.

Illustratively, one of the insertion portions 518 is correspondingly connected to one of the abutment segments 5151 to form an L-shaped structure, so that the first abutment portion 515 and the two insertion portions 518 jointly form a U-shaped structure, enabling the liquid in the flow guiding groove 511 to be easily discharged from the liquid discharging hole 517.

In some embodiments, still referring to FIG. 4, the mounting base 50 may further include a screw sleeve 53. One end of the screw sleeve 53 extends into the main body 51, and the screw sleeve 53 is configured to be connected to the output electrode 30.

The screw sleeve 53 may be connected to the main body 51 in various manners. For example, the main body 51 is provided with a threaded hole, and the screw sleeve 53 is screwed into the threaded hole. Such a structure can make the screw sleeve 53 detachable and facilitate replacement of the screw sleeve 53. For another example, the screw sleeve 53 is pre-embedded into the main body 51. The screw sleeve 53 is pre-embedded into the main body 51 in the forming process of the main body 51, and after the main body 51 is solidified and formed, the screw sleeve 53 and the main body 51 are fixed together.

Illustratively, the screw sleeve 53 may be made of a metallic material, such as copper, iron, aluminum, an aluminum alloy, and stainless steel.

Figure 6:
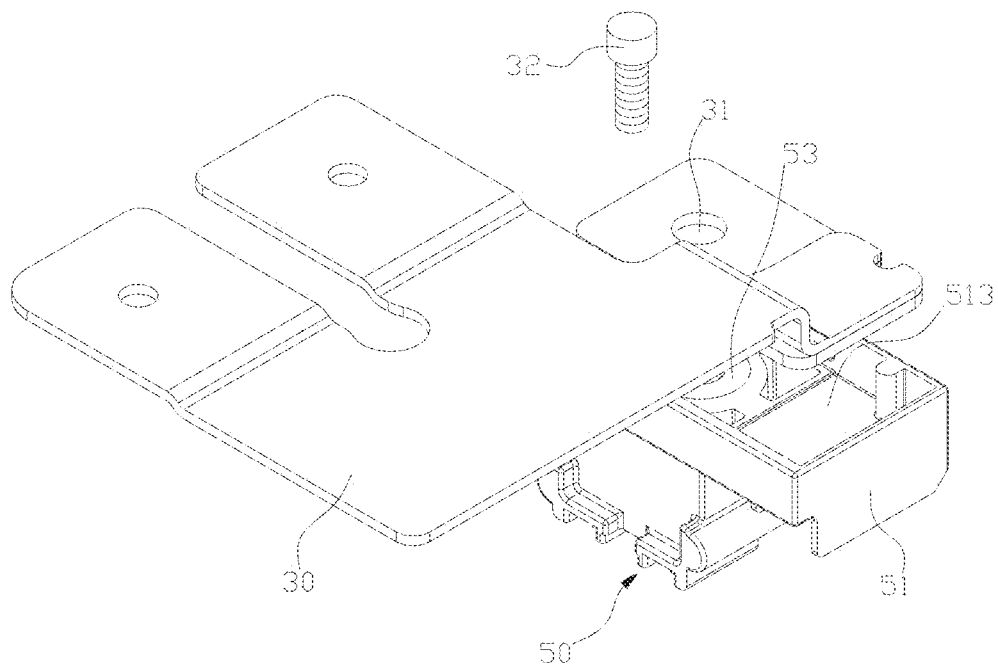
FIG. 6 is an exploded view of the mounting base and an output electrode of the battery shown in FIG. 2.

Referring to FIG. 6, FIG. 6 is an exploded view of the mounting base 50 and the output electrode 30 of the battery 100 shown in FIG. 2. The screw sleeve 53 is configured to be in a threaded fit with a screw 32 to mount the output electrode 30 to the second end 513 of the main body 51.

When the output electrode 30 is being mounted, the output electrode 30 can be mounted to the second end 513 of the main body 51 by running the screw 32 through a mounting hole 31 in the output electrode 30 and screwing the screw into the screw sleeve 53.

In some embodiments, still referring to FIG. 4, the second end 513 of the main body 51 is provided with an enclosure 520. The enclosure 520 is distributed along an edge of the second end 513 of the main body 51, and the enclosure 520 defines an accommodating space 521 for accommodating part of the output electrode 30.

Illustratively, the enclosure 520 is distributed in the form of a rectangle, and the enclosure 520 includes a first protrusion 5201 and a second protrusion 5202. The first protrusion 5201 and the second protrusion 5202 are connected end to end so as to form a closed structure. The height by which the first protrusion 5201 protrudes from the second end 513 is greater than the height by which the second protrusion 5202 protrudes from the second end 513. The first protrusion 5201 is located on three sides of the rectangle, and the second protrusion 5202 is located on two sides of the rectangle, with a part of the first protrusion 5201 and a part of the second protrusion 5202 being located on one side of the rectangle. The second abutment portion 516 is a part of the first protrusion 5201.

Figure 7:
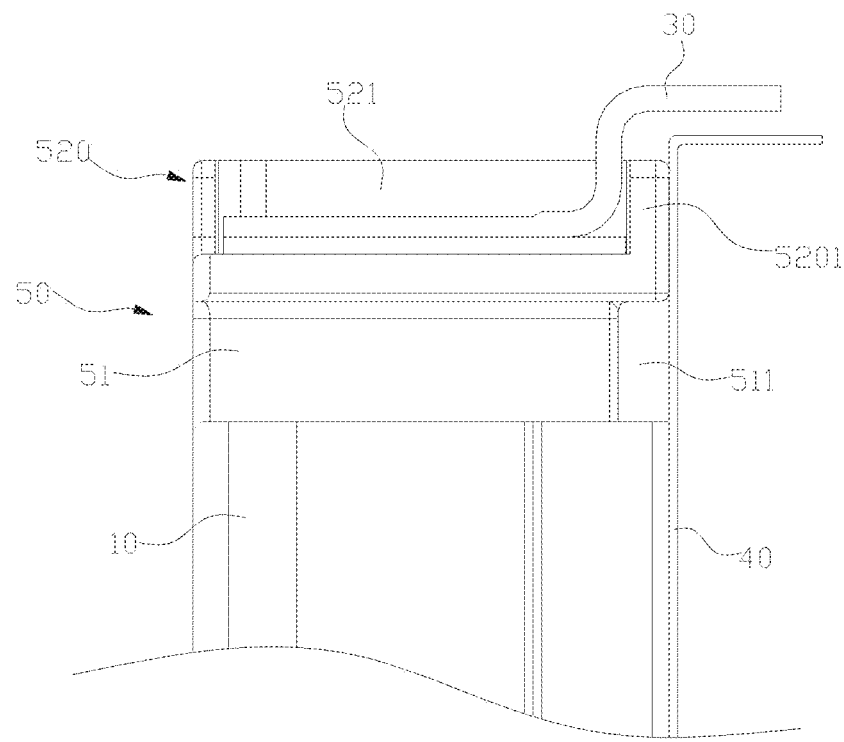
FIG. 7 is a positional relationship diagram of the mounting base, the output electrode, the end plate, and an insulating member of the battery shown in FIG. 2.

Referring to FIG. 7, FIG. 7 is a positional relationship diagram of the mounting base 50, the output electrode 30, the end plate 10, and the insulating member 40 of the battery 100 shown in FIG. 2. After the output electrode 30 is mounted on the main body 51, a part of the output electrode 30 is located in the accommodating space 521 of the enclosure 520, and a part of the first protrusion 5201 of the enclosure 520 separates the output electrode 30 from the insulating member 40. Since the first protrusion 5201 of the enclosure 520 is higher than the second protrusion 5202 (shown in FIG. 4), the liquid level in the accommodating space 521 is less likely to exceed the first protrusion 5201, and the liquid in the accommodating space 521 is less likely to pass over the first protrusion 5201 to form a liquid film between the main body 51 and the insulating member 40, increasing the creepage distance between the output electrode 30 and the end plate 10.

Figure 8:
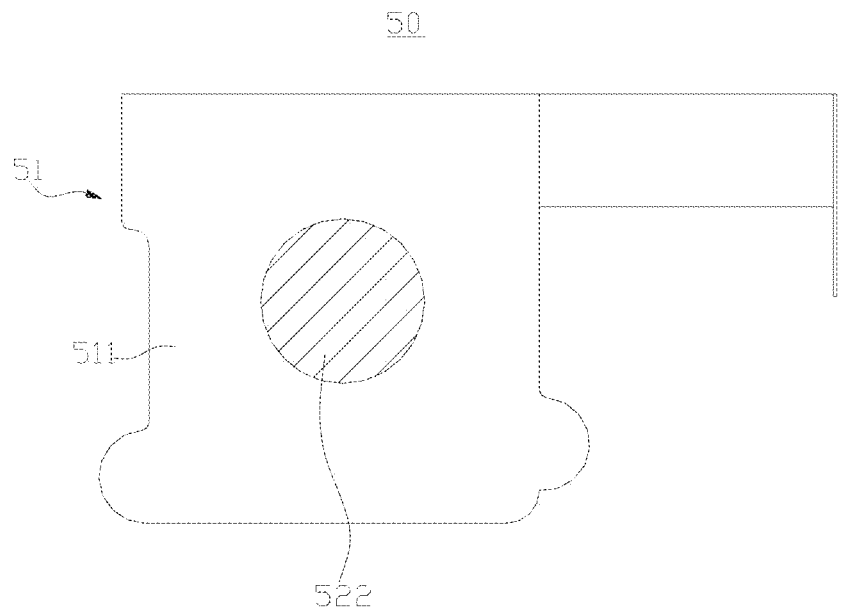
FIG. 8 is a schematic structural diagram of a mounting base provided in some embodiments of the present application.

It should be noted that, in the embodiments of the present application, the arrangement of the flow guiding groove 511 is not limited to the arrangement described in the above embodiments, and the flow guiding groove 511 may be arranged in other manners. In some embodiments, referring to FIG. 8, FIG. 8 is a schematic structural diagram of a mounting base 50 provided in some embodiments of the present application. The flow guiding groove 511 is located at the periphery of the main body 51 on the side facing the insulating member 40 (shown in FIG. 7) such that a projection portion 522 for contact with the insulating member 40 is formed on the side of the main body 51 facing the insulating member 40. The flow guiding groove 511 having such a structure can also prevent the electrical connection between the output electrode 30 and the end plate 10 by means of the liquid between the main body 51 and the insulating member 40, and can effectively reduce the risk of electrical connection between the output electrode 30 and the end plate 10 by means of the liquid between the main body 51 and the insulating member 40, which could otherwise cause failure of the insulation protection of the output electrode 30 from the mounting base 50.

The projection portion 522 may be circular, elliptical, rectangular, etc., which will not be limited in the embodiments of the present application. Illustratively, in FIG. 8, the projection portion 522 is circular.

It should be noted that the embodiments in the present application and features in the embodiments may be combined with each other without conflicts.

The above embodiments are only used to explain the technical solutions of the present application, and are not intended to limit the present application, and various modifications and changes of the present application may be made by those skilled in the art. Any modifications, equivalent substitutions, improvements, and the like made within the spirit and principle of the present application should be included within the scope of protection of the present application.

The invention claimed is:

1. A mounting base configured to be connected to an end plate and an output electrode, an insulating structure being provided on one side of the end plate to insulate the end plate from a battery cell, the mounting base comprising:
   a main body provided with a flow guiding groove on a side of the main body facing the insulating structure,
   wherein the flow guiding groove prevents an electrical connection between the output electrode and the end plate by means of a liquid between the main body and the insulating structure,
   wherein the main body has a first end and a second end that are opposite to each other in a first direction, the first end connects to the end plate, and the second end has the output electrode mounted thereon; and
   the flow guiding groove runs through two sides of the main body in a second direction that is perpendicular to the first direction,
   wherein the main body comprises:
   a base having a first side face;
   a first abutment structure protruding from the first side face to abut against the insulating structure; and a second abutment structure protruding from the first side face, the second abutment structure being arranged opposite to the first abutment structure in the first direction to abut against the insulating structure, and wherein the first abutment structure, the first side face, and the second abutment structure jointly define the flow guiding groove.

2. The mounting base according to claim 1, wherein a height by which the first abutment structure protrudes from the first side face is equal to a height by which the second abutment structure protrudes from the first side face.

3. The mounting base according to claim 1, wherein the base is provided with an insertion structure to be fitted with an insertion groove in the end plate so as to limit disengagement of the main body from the end plate in the first direction.

4. The mounting base according to claim 3, wherein the insertion structure extends in a third direction, and one end of the insertion structure extends beyond the first side face to abut against the insulating structure; and every two of the first direction, the second direction, and the third direction are perpendicular to each other.

5. The mounting base according to claim 4, wherein the first abutment structure has a first abutment face for abutting against the insulating structure; and the insertion structure has a second abutment face for abutting against the insulating structure, the second abutment face being coplanar with the first abutment face.

6. The mounting base according to claim 1, wherein the flow guiding groove has a depth greater than or equal to 2 millimeters.

7. The mounting base according to claim 1, wherein the main body is provided with a liquid discharging hole in communication with the flow guiding groove.

8. A battery, comprising:
an end plate;
a battery cell;
an output electrode connected to an electrode terminal of the battery cell and outputs electric energy of the battery cell;
an insulating structure provided between the battery cell and the end plate to insulate the end plate from the battery cell; and
a mounting base according to claim 1, wherein the mounting base is mounted on the end plate, the output electrode is mounted on the mounting base, and the flow guiding groove is provided on the side of the main body facing the insulating structure.

9. A power consuming device, comprising the battery according to claim 8.

* * * * *